United States Patent [19]

Miller et al.

[11] Patent Number: 5,527,173

[45] Date of Patent: Jun. 18, 1996

[54] APPARATUS FOR PRODUCING PLASTIC ARTICLES WITH INSERTS

[75] Inventors: William E. Miller, Orangeville; Thomas M. McGinley, Brampton, both of Canada

[73] Assignee: Husky Injection Molding Systems Ltd., Bolton, Canada

[21] Appl. No.: 229,007

[22] Filed: Apr. 18, 1994

[51] Int. Cl.⁶ .............................. B29C 31/08; B29C 45/14
[52] U.S. Cl. ...................... 425/126.1; 264/267; 264/275; 264/279; 264/334; 425/125; 425/129.1; 425/438; 425/443; 425/556; 425/575; 425/588
[58] Field of Search .................... 425/121, 126.1, 425/129.1, 125, 437, 438, 556, 575, 588, 443; 264/247, 267, 268, 275, 335, 336, 334, 279

[56] References Cited

U.S. PATENT DOCUMENTS

| | | | |
|---|---|---|---|
| Re. 33,237 | 6/1990 | Delfer, III . | |
| 3,837,772 | 9/1974 | Van de Walker et al. . | |
| 4,093,413 | 6/1978 | Schollhorn et al. | 425/126.1 |
| 4,571,320 | 2/1986 | Walker | 425/437 |
| 4,648,825 | 3/1987 | Heil et al. . | |
| 4,679,997 | 7/1987 | Plenzler et al. | 425/126.1 |
| 4,721,452 | 1/1988 | Delfer, III | 425/556 |
| 4,732,726 | 3/1988 | Grannen, III | 425/556 |
| 4,784,592 | 11/1988 | Dromigny | 425/126.1 |
| 4,838,776 | 6/1989 | Hasl | 425/129.1 |
| 4,865,793 | 9/1989 | Suzuki et al. | 425/129.1 |
| 4,988,472 | 1/1991 | Orimoto et al. | 264/275 |
| 5,297,897 | 3/1994 | Venrooij et al. | 425/121 |

FOREIGN PATENT DOCUMENTS

| | | |
|---|---|---|
| 0357777 | 2/1993 | European Pat. Off. . |
| 62-70010 | 3/1987 | Japan ................ 425/121 |

OTHER PUBLICATIONS

Patent Abstract of Japan, vol. 11, No. 356, 20 Nov., 1987, JP-A62134233 to Toyoda Gosei Co. Ltd. Jun. 17, 1987.
Patent Abstract of Japan, vol. 9, No. 103, 8 May, 1985, JP-A-59227429 to Hitachi Seisakusho KK, 20 Dec., 1984.
Patent Abstract of Japan, vol. 15, No. 168, 26 Apr., 1991, JP-A3034811 to Pentell KK, 14, Feb., 1991.
Patent Abstract of Japan, vol. 9, No. 34, 14 Feb., 1985, JP-A-59178162 to UBE Kosan KK, 9 Oct. 1984.

*Primary Examiner*—Jay H. Woo
*Assistant Examiner*—Joseph Leyson
*Attorney, Agent, or Firm*—Bachman & LaPointe

[57] ABSTRACT

The present invention relates to a molding apparatus having a first mold half with a core portion and a second mold half with a cavity portion wherein the core portion moves relative to the cavity portion between mold open and mold closed positions. The molding apparatus further includes a carrier plate for receiving molded articles and holding inserts to be incorporated into the molded article. The present invention also relates to transferring the inserts to the mold cores prior to molding.

18 Claims, 5 Drawing Sheets

APPARATUS FOR PRODUCING PLASTIC ARTICLES WITH INSERTS

BACKGROUND OF THE INVENTION

The present invention relates to an improved apparatus and method for removing molded articles from a multi-cavity injection mold and loading inserts into the cavity of the same mold. The apparatus and the method of the present invention have particular utility in the manufacture of laminated plastic containers suitable for holding foods, beverages and chemicals.

The art of molding through, around or adjacent inserts placed in an injection molding cavity are well known in the injection molding industry. A number of different methods have been developed to load the inserts to be included within the molded article and to unload the molded article from the machine. Typically, the method that is used for a particular molding system takes into account the size, shape and number of the inserts to be loaded and such other factors as cost, degree of automation, complexity, speed and reliability.

For example, U.S. Pat. No. 3,837,772 to Van de Walker et al. illustrates a top entry robot system which is fed with inserts which are held in place on the robot using a vacuum. Upon opening the mold, a transfer plate moves into position opposite core pins in the mold. When the transfer plate is in this position, the vacuum is substituted by a pressure which forces the inserts onto the core pins where they are held in place by a vacuum applied to the core pins. If the inserts are open-ended, this vacuum method may not be feasible or effective.

U.S. Pat. No. 4,648,825 to Heil et al. illustrates a different system having a horizontal gantry structure which spans perpendicularly across the injection machine. An arm which depends from one end of the gantry secures a load carrier while another arm depending from the opposite end of the gantry secures an unload carrier. The arms move toward each other when the mold is opened to perform the loading and unloading functions. This approach disadvantageously requires two tooling arms, occupies substantial floor space on both sides of the machine, and is very costly.

European patent document No. 0 357 777 to Orimoto et al. shows a plastic mouth insert which is loaded into the injection mold. The purpose of this insert is to provide heat resistance in the neck finish area which is required during subsequent operations in making a container. As discussed in this patent document, it is advantageous to accurately center the insert in the cavity and to support it in place as the injected plastic flows around it. For the purpose of loading the insert into the injection mold, it is recommended to position the insert in place between the mold splits, then close the splits in the conventional manner. In some cases, it may not be feasible or practical to deliver the insert from the carrier plate to its final position in the mold due to space restrictions or alignment problems and a co-operative effort from both carrier plate and mold are essential. Where molds already employ the use of moving mold ejection components, the return stroke of the components can provide the double function of insert retrieval, saving redundant motion and time. Hence, the loading device should also be capable of working in concert with the most advanced molds as previously discussed, which incorporate non-rectilinear mold splits motion.

SUMMARY OF THE INVENTION

Accordingly, it is a principal object of the present invention to provide an improved molding apparatus which uses a single compact carrier plate for the loading of mold inserts and the unloading of molded articles.

It is a further object of the present invention to provide an improved molding apparatus as above which mechanically interacts with a carrier plate insert loading device to effectively aid in the reception and lodgment of an insert in the mold cavity space prior to injection.

It is still a further object of the present invention to provide an improved molding apparatus as above which actively grips and holds or contains an insert in the cavity space.

It is yet a further object of the present invention to provide an improved process for molding an article wherein inserts can be more readily inserted into the mold cavity and molded articles can be unloaded.

Still further objects and advantages to the present invention will become more apparent from the following description and drawings wherein like reference elements depict like elements.

The foregoing objects and advantages may be readily obtained by the improved molding apparatus and process of the present invention. In accordance with the present invention, the improved molding apparatus includes a first mold half having one or more core portions and a second mold half having one or more cavity portions. The first and second mold halfs are movable between an open position and a closed position wherein said core and cavity portions define at least one space in the shape of the article to be molded. The molding apparatus further includes a carrier plate for receiving the molded article(s) after the molding cycle has been completed and for holding the insert(s) to be incorporated into the molded article. The carrier plate is movable from a first position between the mold halfs when the mold halfs are in an open position to a second position outside of the mold halfs. The carrier plate is also indexable between a first position where receptacle(s) for receiving the molded article(s) are aligned with the mold core portion(s) and a second position wherein means for holding the insert(s) is aligned with the mold core portion(s).

The method of the present invention broadly comprises the steps of providing a first mold half having a mold core portion and a second mold half having a mold cavity portion; placing at least one insert on said mold core portion while said mold halfs are in an open position by aligning a carrier plate with means for holding said at least one insert with said mold core portion and transferring said at least one insert to said mold core portion; withdrawing said carrier plate from between said mold halfs; moving said mold halfs so that said mold core portion abuts said mold cavity portion; injecting plastic material into a space defined by said abutted mold core and mold cavity portions to form at least one molded article having at least one insert therein, moving said mold halfs to a mold open position, and moving said carrier plate into said position between said mold halfs to remove the at least one molded article.

Further details of the apparatus and method of the present invention are discussed in the following description and drawings wherein like reference numerals depict like elements.

DETAILED DESCRIPTION OF THE PREFERRED EMBODIMENT(S)

Figure 1:
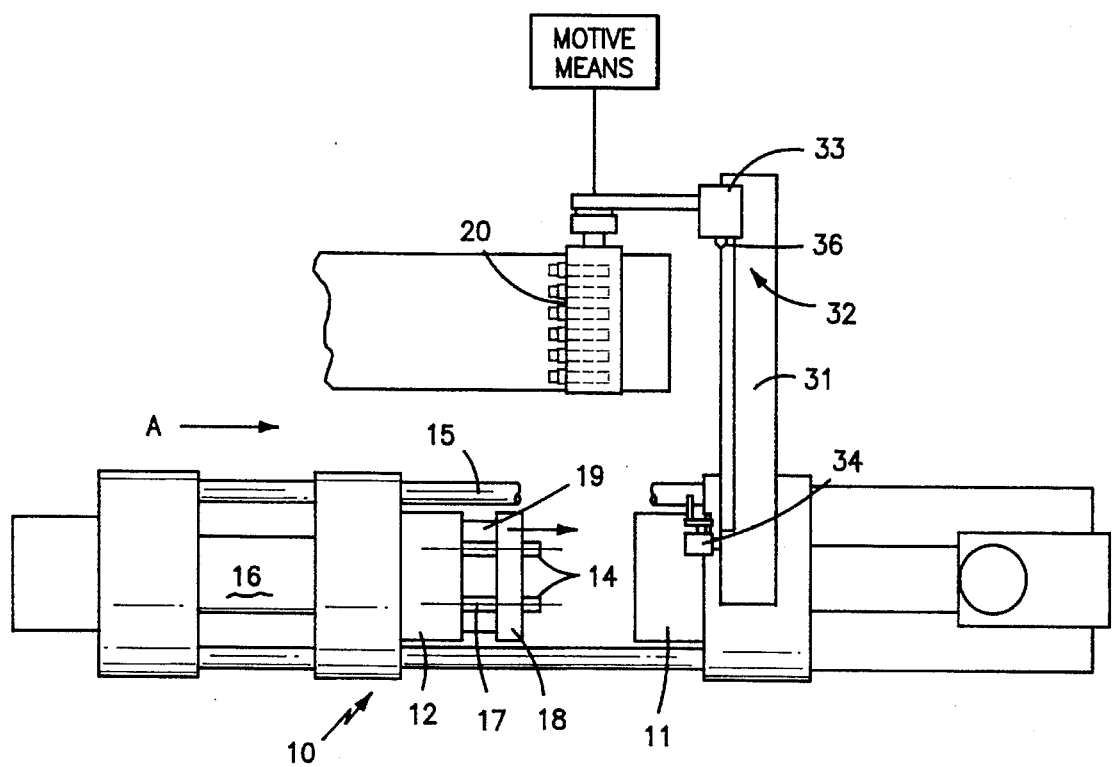
FIG. 1 illustrates a top view of an apparatus for producing plastic articles.

Referring now to the drawings, FIG. 1 illustrates an apparatus for producing plastic articles in accordance with the present invention. The apparatus includes a molding machine 10 preferably comprising a multicavity machine. The number of cavities and the arrangement thereof shown in FIG. 1 are exemplificative only. It should be recognized that any convenient number of cavities and any suitable arrangement of the cavities may be employed in the machine 10. In fact, one could use a single cavity arrangement, although multicavity arrangements are preferred for economic reasons.

Figure 2:
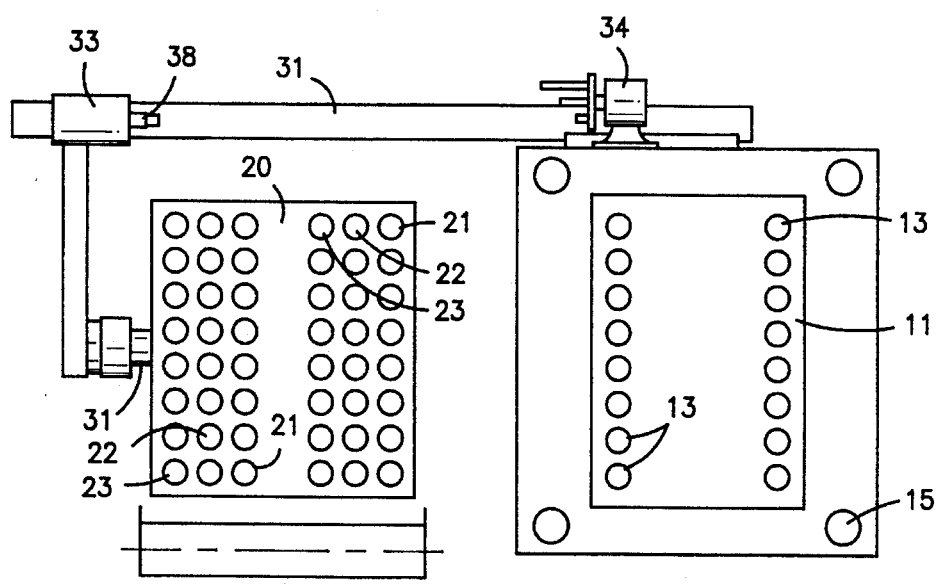
FIG. 2 is an end view of a mold cavity plate and a carrier plate when viewed in the direction "A" shown in FIG. 1 with the carrier plate being in an outboard position.

The machine 10 includes a first mold half 11 which is a cavity half and a second mold half 12 which is a core half. The first mold half 11 has at least one cavity 13 therein and preferably a plurality of cavities 13. A representative cavity arrangement is shown in FIG. 2. This arrangement has two spaced rows of cavities 13 with each row containing eight cavities. The second mold half 12 has at least one elongate core 14 therein with the number of cores corresponding to the number of cavities. Core(s) 14 are each engageable with a respective cavity for seating therein in a mold-closed position to form a closed mold for the formation of one or more plastic articles therein by injection molding. The number of articles formed in an injection molding cycle will depend on the number of cavities and corresponding cores. Normally, the core(s) 14 reciprocate from a mold-closed position seated in said cavities for the formation of the molded articles to a mold-open position spaced from said cavities forming a gap between the cores and cavities for ejection of the molded articles. FIG. 1 shows the first and second mold portions in a mold open position. The mold portions 11 and 12 reciprocate on tie rods 15 and may be powered by any convenient motive means known in the art, such as by hydraulic cylinder 16, in a predetermined cycle. Molten plastic material is injected into a space 76 formed between each core and cavity in the mold-closed position by known injection molding procedures.

It is preferred to retain the formed articles on cores 14 after formation of the articles and upon reciprocation of the mold portions from the mold-closed position to the mold-open position. A carrier plate 20 is provided to receive the molded articles removed from the cores 14. Removal of the articles from the cores onto the carrier plate 20 may be accomplished by blowing air through vent lines 17 and/or by the use of a stripper plate 18 reciprocating on guide pins 19.

The carrier plate 20 is movable from the outboard position shown in FIGS. 1 and 2 to a position between the mold halfs 11 and 12. Any suitable indexing means 31, 32, 33, 34, 36 and 38 known in the art may be used to move the carrier plate 20. One such mechanism is shown in U.S. Pat. No. Re. 33,237 to Delfer which is hereby incorporated by reference herein.

Carrier plate 20 is provided with at least one set of receivers 21 for cooling the molded plastic articles. If a longer cooling time in the receiver is desired or needed, multiple sets of receivers, such as receivers 21 and 22, may be employed. The carrier plate in FIG. 2 includes a first set of carrier plate receivers 21 and a second set of carrier plate receivers 22. The carrier plate 20 also includes a set of insert holders 23, which are positionally arranged in like manner to receivers 21 and 22. It should be noted that each of sets 21, 22 and 23 corresponds to the arrangement of the first mold portion cavities 13, with each of said sets being spaced apart by a fixed distance.

Figure 3:
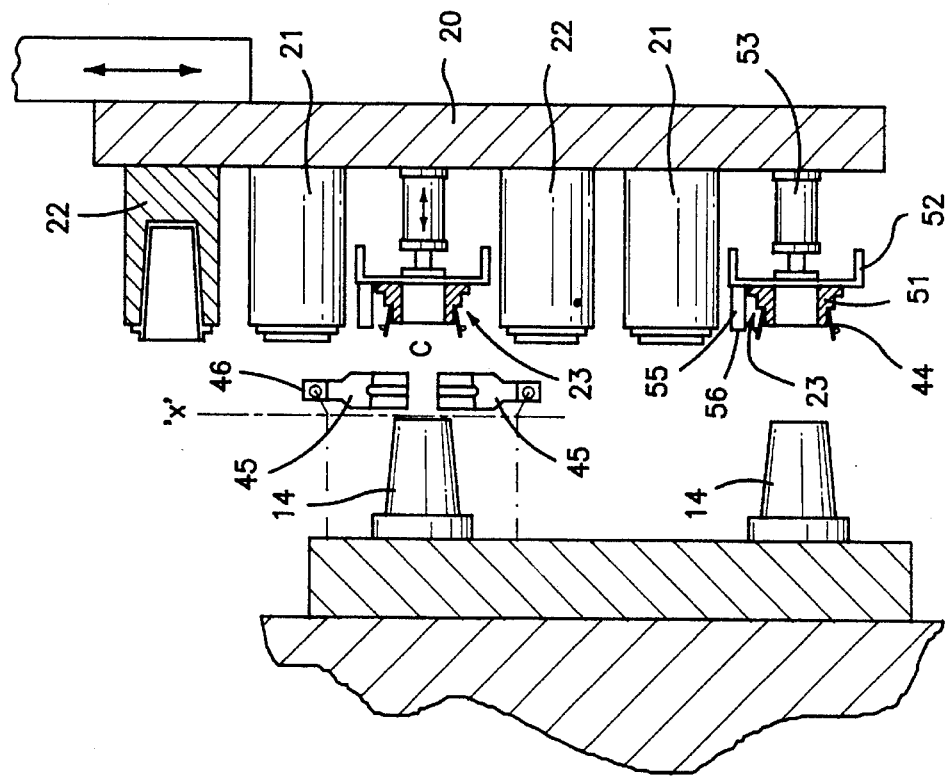
FIG. 3 is a top view of a carrier plate in a position to load inserts onto mold core portions of the apparatus of FIG. 1 with the insert holding means shown in partial cross section.

FIG. 3 shows a top view of a carrier plate 20 having two columns or sets 23 of inserts 44 in alignment with mold cores 14 having a complementary configuration. Mold splits 45 mounted to the mold core half 12 are shown in a forward extended position. The mold splits 45 are fastened to slides 46 which move the mold splits 45, and a molded article held by the mold splits, axially off a respective core 14. The article is released from the grasp of the mold splits through separation of same occurring at a point X, toward the end of the ejection stroke. Cams or other mechanical devices well known in the art may be employed to dictate the exact distance the mold splits will separate from each other and the position at which they will separate.

The carrier plate 20 has one or more mandrels 51 mounted thereto to hold insert(s) 44. Each mandrel 51 can be made of a flexible material such as a plastic with a hollow core and serrated sides which act as fingers to spring against and hold the inside diameter of the insert 44. Each mandrel 51 is preferably mounted on a structural channel 52 which is fastened to and positioned by actuating piston-cylinder unit 53. The piston-cylinder unit 53 is used to extend the channel 52 and the mandrel 51 and thereby advance the insert 44 to an axial position between the open mold splits 45. Of course, there are numerous methods for 15 holding an insert on an insert holder dependent on its size and shape and how it must interact with the cooperating mold components which are to receive the insert. This is but one example.

Figure 4:
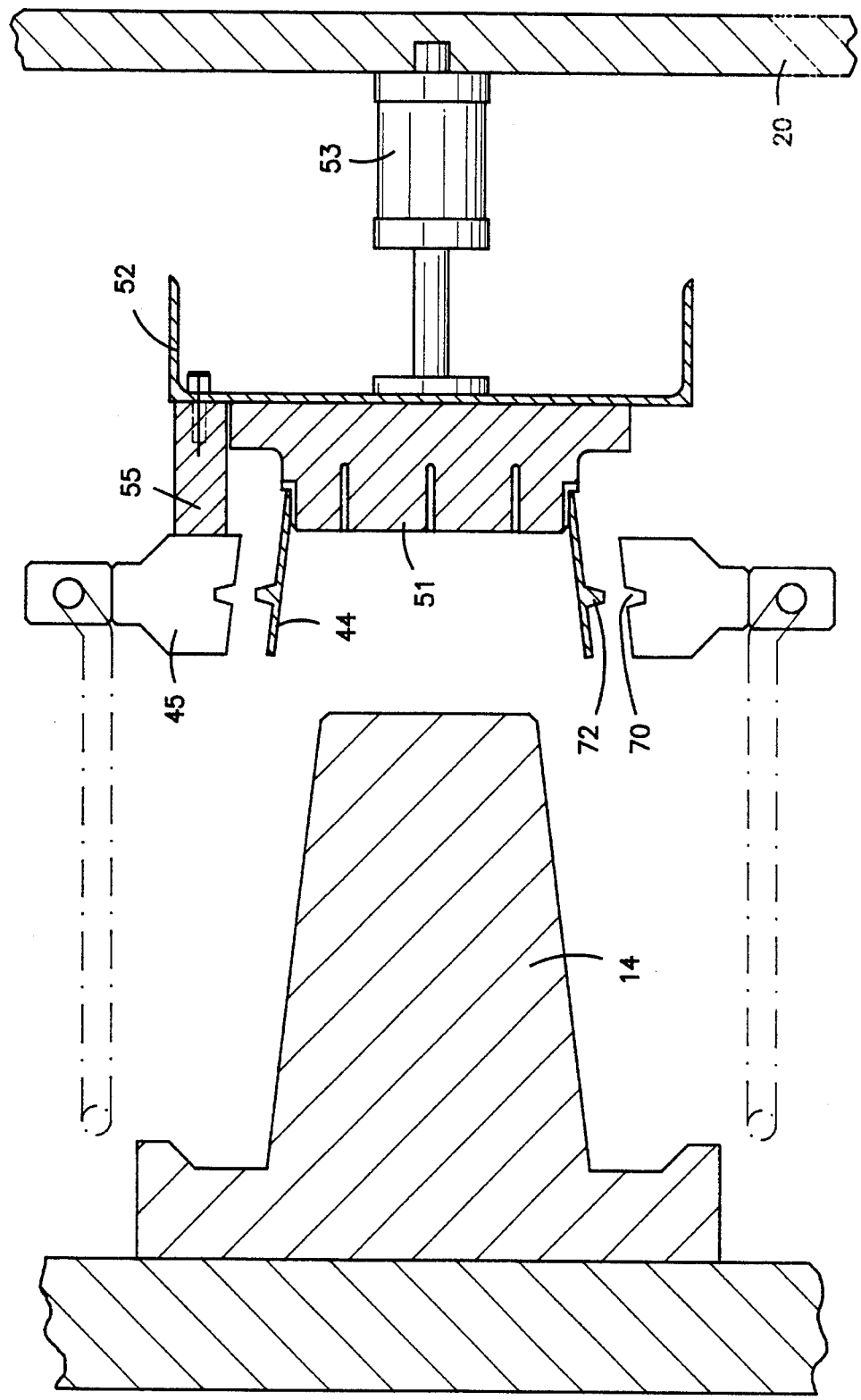
FIG. 4 is a top view showing an insert in an extended position between two mold splits.

Adjacent the columns of insert holders 51 are the columns of receiving stations 21 and 22 which receive the molded article(s) after ejection. Bumper pads 55 are fastened to the structural channel 52 and are sized such that their forward face 56 is a prescribed distance from the base of the insert 44. As shown in FIG. 4, when the mandrel holding channel 52 moves forward, the face 56 of the bumper pad 55 hits a corresponding plane on the mold split 45. The bumper pad 55 thereby defines the correct axial position of the insert between the mold splits. As the actuating cylinder 53 continues to push forward, the relative axial position of both the insert 44 and the mold splits 45 are kept constant. As the mold splits 45 move inward toward the center axis of a respective core 14, the mold splits 45 come together to grip or envelope the insert 44. To this end, each mold split 45 has a notch 70 for gripping or receiving a portion 72 of the insert 44.

Figure 5:
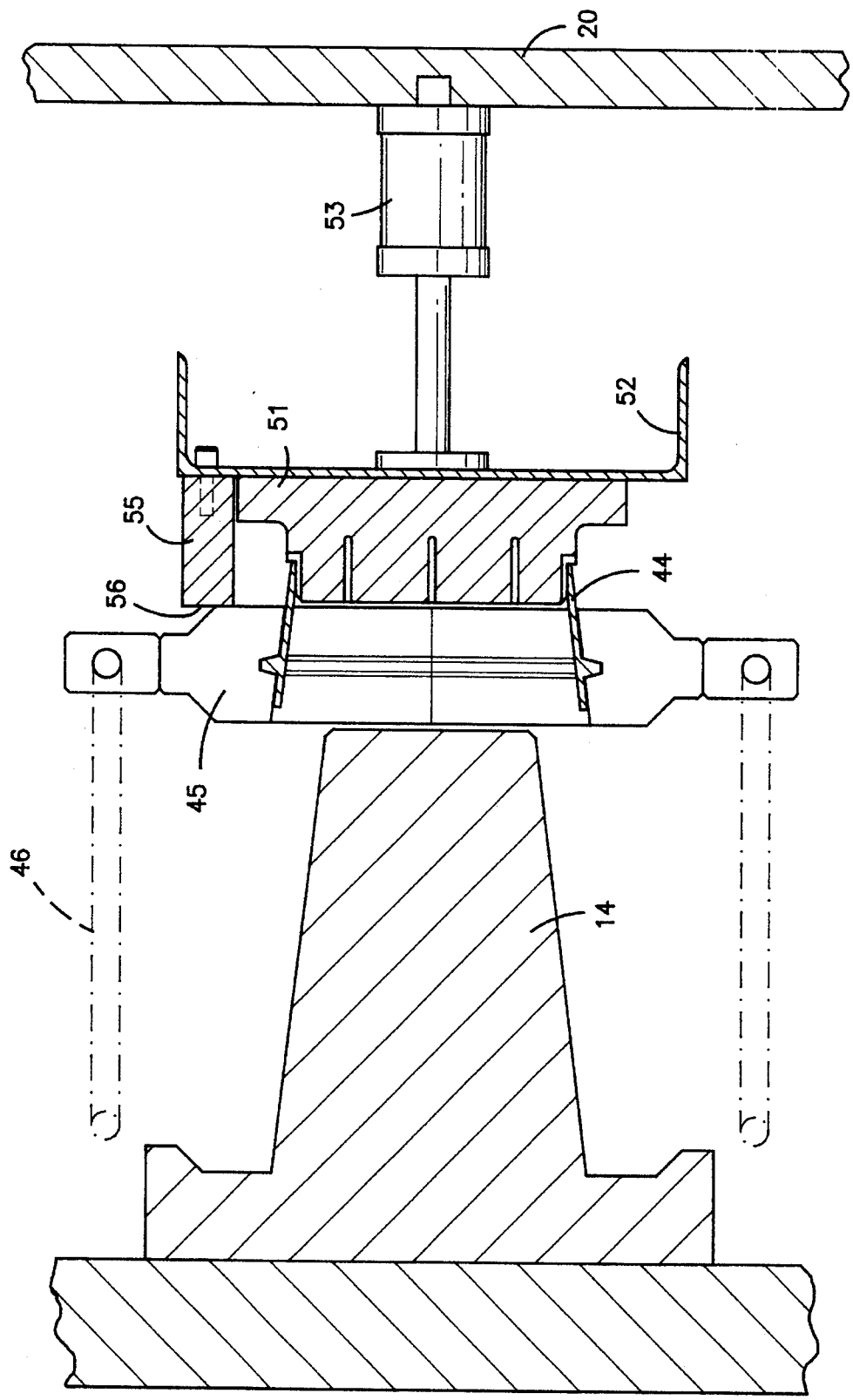
FIG. 5 is a top view showing an insert being gripped by the mold splits.

FIG. 5 shows the moment when the insert 44 is first closed upon by the mold splits 45. Further movement of the mold splits to their seated position effectively strips the insert from the mandrel 51. After the insert has been stripped from the mandrel 51, the carrier plate 20 is moved from a position where the insert(s) are aligned with the mold core(s) 14 toward the outboard position and the mold halfs 11 and 12 are moved toward their closed position.

Figure 6:
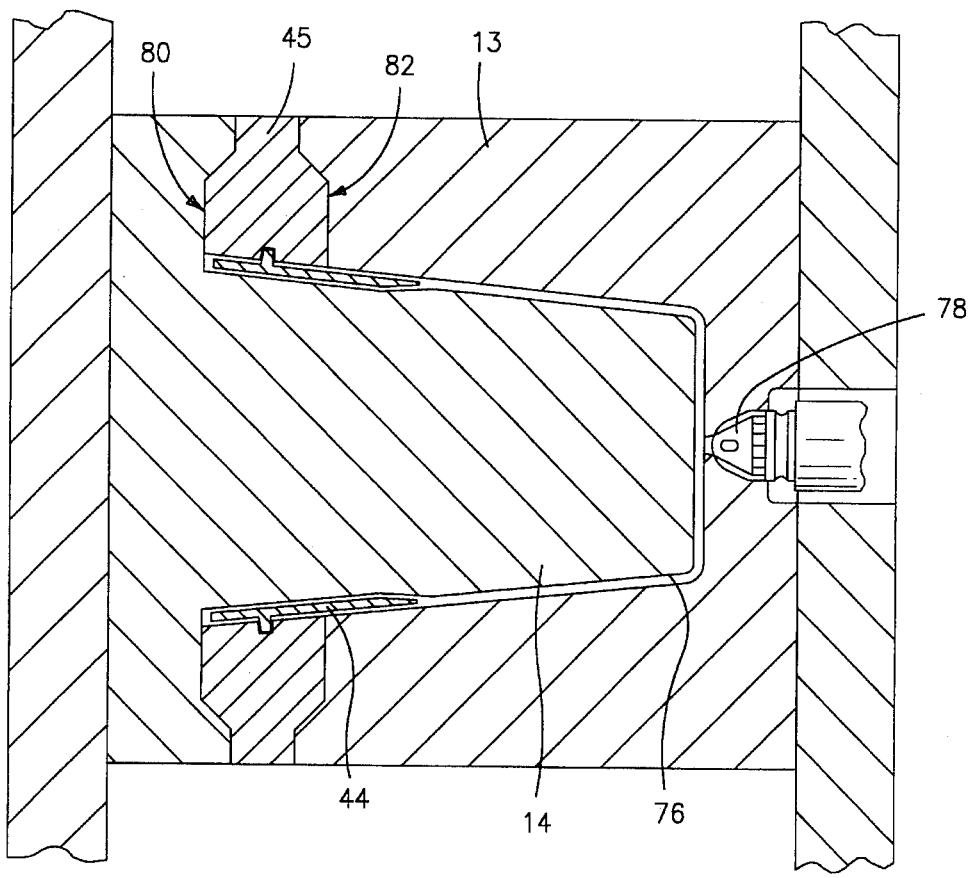
FIG. 6 is a sectional view showing an insert in a mold closed position.

FIG. 6 shows an insert 44 lodged in its position in the space 76 defined by the mold core and cavity prior to injection of the plastic material. FIG. 6 also shows the manner in which the mold splits 45 are accommodated by shaped mold cavity and mold core portions 80, 82. Plastic material is injected into the space 76 via nozzle 78. The plastic material flows around the insert 44 and incorporates same into the molded article being formed. After the plastic material has been cooled and solidified, the mold portions 11 and 12 are moved to their open position. During this opening operation, the molded article remains on the core 14. After the molds have reached the open position, the carrier plate 20 is moved from the outboard position to a position intermediate the mold halfs where one of the sets of receiving stations is aligned with each mold core(s) 14. The slides 46 are then moved toward the carrier plate 20 and the molded article is unloaded into one of the receiving stations 21 and 22 mounted to the carrier plate 20. The operation of carrier plate 20 in this respect is the same as in the aforementioned U.S. Pat. No. Re. 33,237 which is again hereby incorporated by reference herein.

Figure 8:
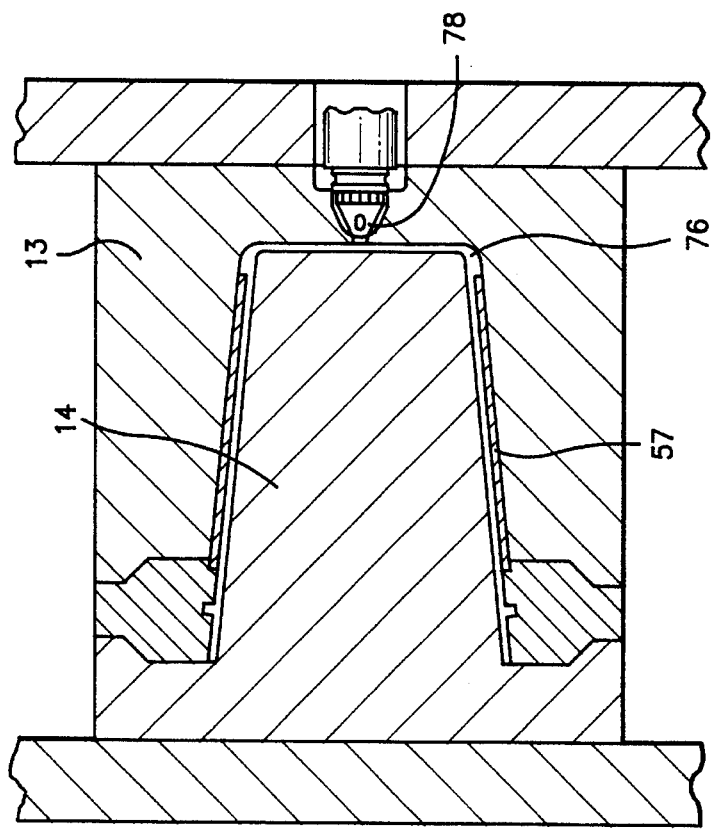
FIG. 8 illustrates the insert of FIG. 7 in a mold closed position.
Figure 7:
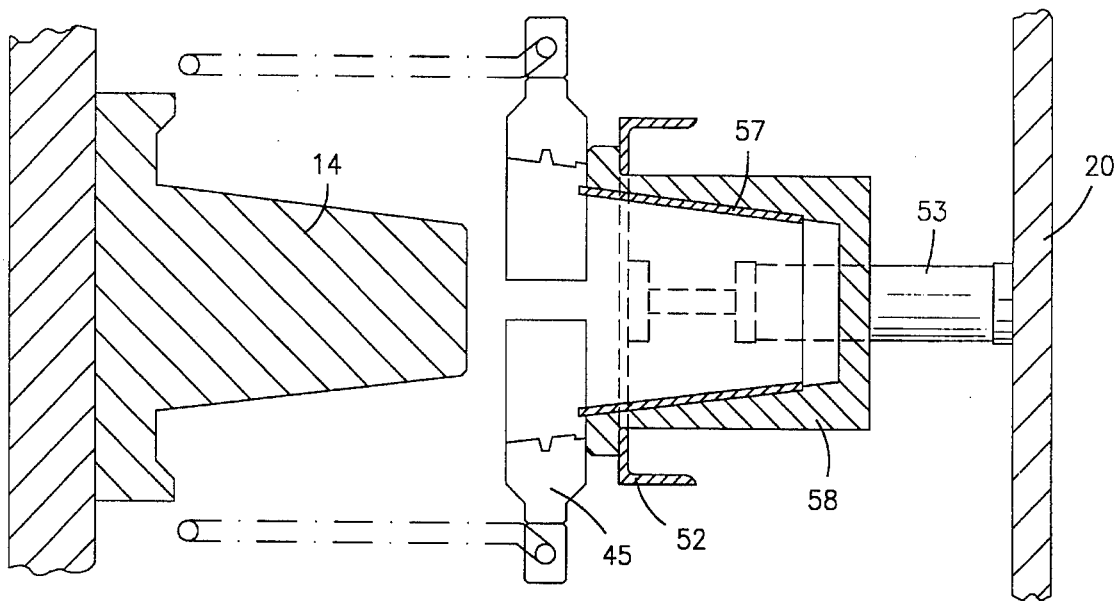
FIG. 7 illustrates an alternative embodiment of an insert to be incorporated into a molded article and an alternative device for holding said insert.

FIG. 7 illustrates an alternative embodiment wherein an insert 57 of elongated conical or tubular construction is to be loaded. The insert is not held on a mandrel. Instead, it is held in a receptacle 58 which is mounted to the structural channel 52. The insert 57 may be held in place in receptacle 58 by applying vacuum or other alternate means of retention. As described above, the receptacle 58 on the channel 52 moves the insert 57 to a point where mold splits 45 grasp the insert 57 and remove it from the receptacle 58. The mold splits 45 then carry the insert 57 the remainder of the distance until it is seated on the core 14. FIG. 8 shows the insert 57 lodged in its position in the cavity while the mold is closed.

The operation of the apparatus 10 after molding has been completed is as follows. Once the mold is opened, the carrier plate 20 moves into place between the mold halves 11 and 12 with the receiving stations 21, 22 opposite the mold cores 14. The mold splits holding plate 46, commonly referred to as a slide, then moves forward with the mold splits 45 toward the receiving stations and once the molded article has partially entered the receiving station, the mold splits 45 continue to move forward but also move apart from each other until the molded article is no longer in contact with the mold splits and is fully engaged in a respective receiving station. The carrier plate 20 then indexes laterally a short distance, enough to move the molded article in the receiving station aside from being in axial alignment with the mold core 14 and to position the insert 44, 57 to be loaded in direct axial alignment with a respective mold core 14. The insert holding means 51, 58 is then extended, with the insert 44, 57 toward and over the core 14 until the insert is positioned a predetermined distance past the plane of the forward face of the opened mold splits. At that point, the insert holding means 51, 52, and 53 contact the mold splits by way of bumper pad forward face 56 hitting the front surface of mold split 45 and together they are pushed by actuating cylinder 53 to return the mold splits 45 to the rearward position. As the rearward mold splits motion takes place, the mold splits come slowly together gripping or enveloping all or part of the insert and are thereby interactively removing or receiving the insert from the carrier plate insert loading means. The insert holding means 51, 52 and 53 are then retracted and the carrier plate 20 is removed to a location outside the mold for insert loading onto the carrier plate and molded part unloading, as required. With the insert now supported in place by the mold splits, the mold is closed and plastic injection is initiated.

The apparatus of the present invention has numerous advantages associated with it. For example, a single device, namely the carrier plate described herein, loads the mold with inserts and unloads the completed article from the mold. Still further, the carrier plate performs the loading and unloading operations from a single face. Still further, the apparatus mechanically grips, holds or envelopes an insert in the cavity space. Still further, the apparatus lends itself to a method of installing an insert into a mold where the mold is dynamically interactive with the insertion means of the carrier plate.

It is apparent that there has been provided in accordance with this invention an improved apparatus and method for producing plastic articles which fully satisfies the objects, means, and advantages set forth hereinbefore. While the invention has been described in combination with specific embodiments thereof, it is evident that many alternatives, modifications, and variations will be apparent to those skilled in the art in light of the forgoing description. Accordingly, it is intended to embrace all such alternatives, modifications, and variations as fall within the spirit and broad scope of the appended claims.

What is claimed is:

1. A machine for molding a plastic article which includes an insert, said machine comprising:

a first mold half having a mold core portion and a second mold half having a mold cavity portion, said first and second mold halfs being movable between an open position and a closed position wherein said mold core and cavity portions define a space in the shape of the article to be molded;

a carrier plate movable between an outboard position and inboard positions where said carrier plate is positioned between said mold halfs;

said carrier plate having a first surface which faces said mold core portion when said carrier plate is in said inboard positions;

means for receiving a molded article from said mold core portion when said carrier plate is in a first one of said inboard positions, said receiving means being attached to and protruding from said first surface; and means for carrying an insert to be placed about said mold core portion and into said space while said mold halfs are in said open position and said carrier plate is in a second one of said inboard positions, said insert carrying means being mounted to said first surface;

whereby said carrier plate is loaded and unloaded from said first surface.

2. A machine according to claim 1 further comprising means for indexing said carrier plate between said outboard position and said first and second ones of said inboard positions.

3. A machine according to claim 1 further comprising means for moving said insert carrying means towards the mold core portion and into an extended position, said moving means mounting said insert carrying means to said first surface.

4. A machine according to claim 3 wherein said insert carrying means comprises a holder for said insert and a support member mounted to said holder and said moving means comprises a piston-cylinder unit mounted to said first surface of said carrier plate and connected to said support member.

5. A machine according to claim 4 wherein said holder comprises a mandrel having means for engaging interior surfaces of said insert.

6. A machine according to claim 5 wherein said interior surface engaging means comprises serrated sides on said mandrel.

7. A machine according to claim 4 wherein said holder comprises a receptacle having a central bore in which said insert resides.

8. A machine according to claim 7 further comprising vacuum means for retaining said insert in said bore in said receptacle.

9. A machine according to claim 3 further comprising means for gripping said insert and for removing said insert from said insert carrying means when said insert carrying means has reached said extended position.

10. A machine according to claim 9 wherein said gripping means comprises two axially movable mold splits, said mold splits moving together and gripping said insert after said insert carrying means has reached said extended position and thereafter removing said insert from said insert carrying means and placing said insert about said mold core portion.

11. A machine according to claim 10 wherein said mold splits each have a notch for receiving a portion of said insert.

12. A machine according to claim 10 wherein said mold core portion and said mold cavity portion are shaped so that said mold splits are received between said mold cavity portion and said mold core portion when in said closed position prior to injection of plastic material into said space.

13. A machine according to claim 10 further comprising a bumper means associated with said insert carrying means, said bumper means being fastened to the insert carrying means such that said bumper means abuts a surface of the mold splits as the insert carrying means is moved to said extended position to place the insert in a correct axial position between said mold splits.

14. A machine according to claim 1 wherein:

said mold core half has a plurality of mold cores on a first face;

said mold cavity half having a plurality of mold cavities on a first face thereof;

said plurality of mold cores being equal in number to said plurality of mold cavities and being aligned with said plurality of mold cavities to define a plurality of spaces in the shape of articles to be molded when the first and second mold halfs are in the closed position; and said carrier plate having a plurality of insert carrying means for carrying a plurality of inserts equal in number to the plurality of mold cores.

15. A machine according to claim 14 wherein said carrier plate further has a plurality of molded article receiving means at least equal in number to the plurality of mold cores.

16. The machine of claim 1 wherein said receiving means comprises a receptacle into which said molded article is inserted while said carrier plate is in said first one of said inboard positions.

17. The machine of claim 10 wherein said mold splits move toward said receiving means after the mold halfs begin to move toward said open position and said carrier plate has moved from said outboard position to said first one of said inboard positions and said mold splits moving apart from each other when said molded article engages said receiving means and releasing said molded article after said molded article is fully engaged by said receiving means.

18. The machine of claim 1 wherein said molded article placed in said receiving means is cooled by cooling means while said insert is being placed about said mold core portion.

* * * * *